J. B. ANDERSON.
TORCH.
APPLICATION FILED OCT. 27, 1915.
1,204,389.
Patented Nov. 14, 1916.
2 SHEETS—SHEET 1.
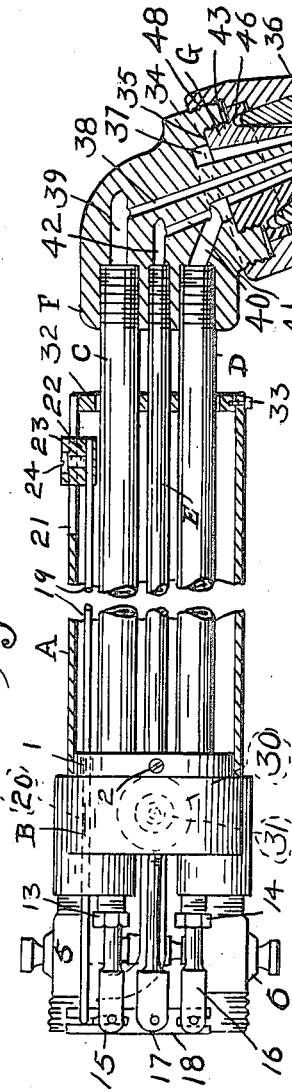
WITNESS
INVENTOR

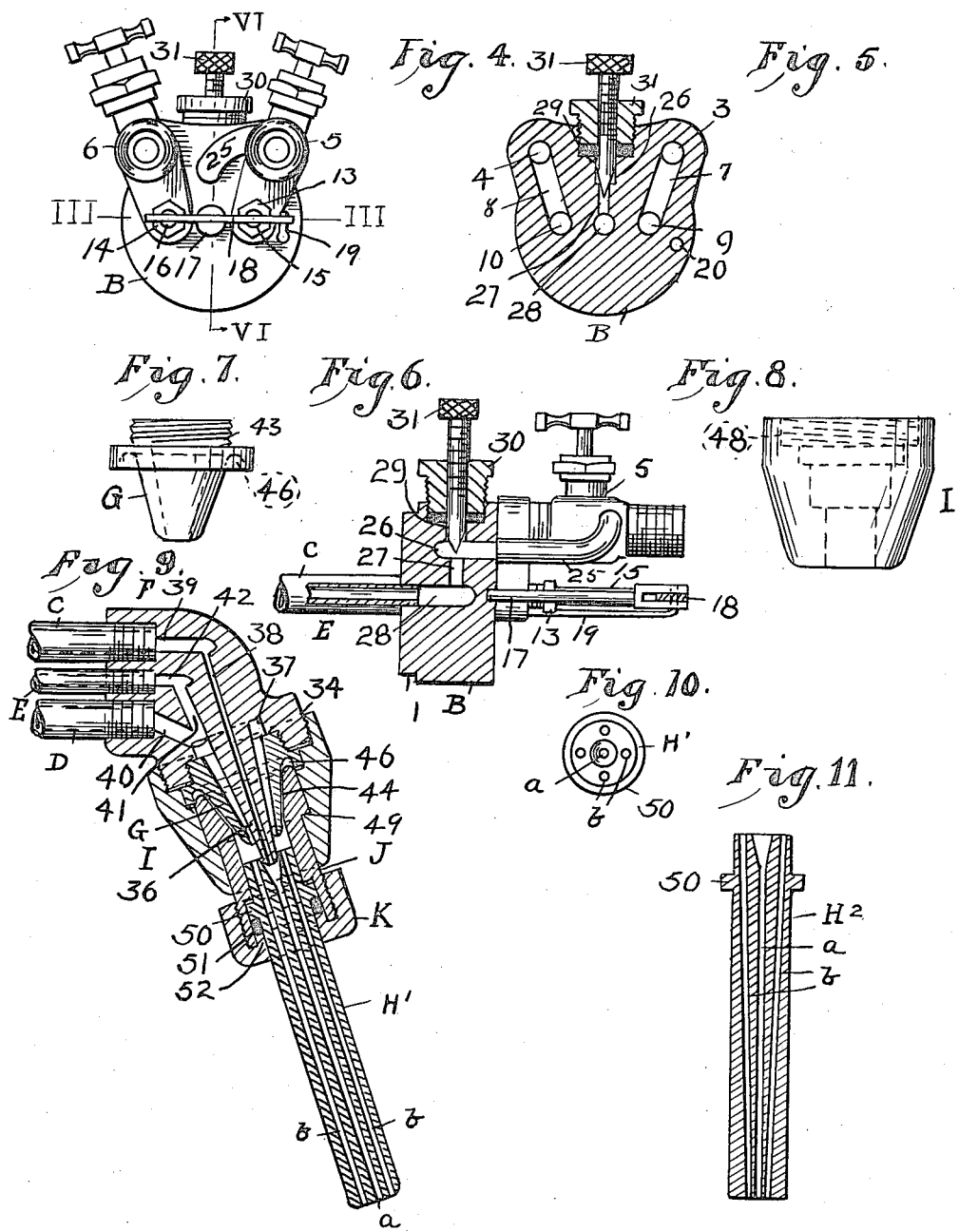

UNITED STATES PATENT OFFICE.

JAMES B. ANDERSON, OF SHALER TOWNSHIP, ALLEGHENY COUNTY, PENNSYLVANIA.

TORCH.

1,204,389.

Specification of Letters Patent.

Patented Nov. 14, 1916.

Application filed October 27, 1915. Serial No. 58,123.

*To all whom it may concern:*

Be it known that I, JAMES B. ANDERSON, a citizen of the United States, and residing in the township of Shaler, in the county of Allegheny and State of Pennsylvania, have invented or discovered new and useful Improvements in Torches, of which the following is a specification.

My invention consists in a new and improved cutting and welding torch for use with oxygen and a combustible gas, preferably acetylene.

The object in view is the production of an inexpensive torch of simple, yet substantial construction, which may be readily changed from a cutting to a welding torch, and in which the gaseous agents are readily controlled and properly proportioned, and in which an efficient mixture of such agents is effected, and which will work at any pressure of gases without danger of backfiring or blowing out.

In the accompanying drawings, Figure 1 is a broken side elevation of my improved torch fitted with a welding tip, the handle casing, head and tip being shown in section for the sake of clearness; Fig. 2 is a broken elevation showing the other side of the handle plug; Fig. 3 is a section along the line III—III in Fig. 4; Fig. 4 is a butt end view of the torch; Fig. 5 is a section along the line V—V in Fig. 3; Fig. 6 is a section along the line VI—VI in Fig. 4; Fig. 7 is an elevation of the cup bushing of the head; Fig. 8 is a similar view of the tip clamping nut; Fig. 9 is a sectional view of the head with a cutting tip mounted therein; Fig. 10 is a butt end view of the cutting tip dismounted, and Fig. 11 is a longitudinal section of a modified form of cutting tip.

The following is a detailed description of the drawings. A is a cylindrical casing, preferably a length of brass tubing, which forms the handle by means of which the torch is grasped by the operator. The outer end of said casing is slipped over the circular boss 1 of the plug B, to which said casing is removably secured as by the screws 2. The plug B is a casting, preferably of brass or bronze provided with an oxygen inlet port 3 and an acetylene inlet port 4, both extending inwardly from the outer end of said plug and countersunk and threaded for the attachment of the gas valves 5 and 6, respectively. The outer ends of the valve bodies are connected by hose, not shown, to the usual gas supplies, such as bottles. The inner ends of the ports 3 and 4, are connected respectively, by the gas passages 7 and 8 with the longitudinal passages 9 and 10 which extend through the plug B. In advance of the mouths of the passages 7 and 8, the diameter of the passages 9 and 10 are contracted to form valve seats 11 and 12, respectively. The inner ends of the passages 9 and 10 are countersunk to receive the ends of oxygen tube C and acetylene tube D, which are preferably fixed in place. The outer ends of said passages are also countersunk and threaded to receive the packing glands 13 and 14, respectively, in which are slidably mounted the needle valves 15 and 16, respectively, the valve 15 being longer than the valve 16, as shown in Fig. 3.

17 is a post extending outwardly from the butt of plug B and provided with a bifurcated end in which is pivoted intermediate of its ends the walking beam 18 whose ends are longitudinally slotted for the loose pivotal connection of the outer ends of the needle valves 15 and 16, whereby the rocking of said beam will alternately move said valves toward and away from their respective seats 11 and 12. However, owing to the different lengths of the valves, the valve 16 is not necessarily closed by the opening of the valve 15, but the valve 15 is tightly closed when the valve 16 is opened fully.

19 is an operating rod having an outer hooked end which pivotally engages the end of the beam 18 outside of the oxygen valve 15 and extends through a longitudinal bore 20 in the plug B and within the casing A to the other end of the latter.

21 is a longitudinal slot in the inner end of casing A in which moves the depending lug 22 of a slide 23 mounted on the face of said casing. Said lug 22 is longitudinally bored to receive the rod 19 which is fixed therein as by screw 24. It is evident that as the slide 23 is moved longitudinally of the casing A, the beam 18 is rocked, operating the valves 15 and 16. A proper regulation of the rod may be obtained by loosening the screw 24 and adjusting the end of the rod in the lug 22 and tightening the screw.

A by-pass 25, leading from the oxygen supply outside of the valve 5, connects with a gas passage 26 in the plug B which is connected by a vertical passage 27 with a horizontal passage 28 into the open mouth of which is sweated the end of the small oxygen tube E.

29 is a vertical bore extending down from the top of the plug B in alinement with passage 27 but of larger diameter. A packing gland box 30 is screwed into the countersunk upper end of said bore and 31 is a needle valve held by threaded engagement in said box 30. The lower end of said valve is adapted to be seated in and close the upper end of the passage 27.

It is evident that the supply of oxygen from the bottle or other container to the tube E is controlled by the needle valve 31. The oxygen tube E is intended to supply heating oxygen to the tip to be mixed with the acetylene or other combustible gas to preheat when the torch is used for cutting. When the torch is used for welding, the valve 31 is closed and the tube E unsupplied with oxygen.

32 is a header pierced for the accommodation of the gas tubes C, D and E and removably fixed, as by screws 33, in the end of the casing A to hold the elements rigidly in proper relationship.

F is the head of the torch, preferably a brass or bronze casting, and provided with an annular flange 34, both internally and externally threaded, having an annular internal shoulder 35.

36 is a tapering nozzle integral with the head F and concentric with the annular flange 34, forming within said flange an annular chamber 37 at the base of the nozzle. 38 is a bore or gas passage extending axially through said nozzle and communicating at its inner end with a gas passage 39 extending through the base of the head F and countersunk and threaded to receive the end of oxygen tube C. A gas passage 40 extends from the base of the head F into the annular chamber 37, the outer end of said passage being countersunk and threaded to receive the end of the acetylene tube D.

41 is a gas passage connecting the inner end of a second passage 42 with the annular chamber 37, while the outer end of said passage 42 extends to the base of the head F and is there countersunk and threaded to receive the end of the oxygen tube E.

G is a bushing, shown dismounted in Fig. 7, having an externally threaded base 43 which is screwed into the flange 34 against the shoulder 35. The bore of bushing G is tapered toward its front, so that when the parts are assembled an annular port of funnel shape is formed for the discharge of gas from the chamber 37. The nozzle 36 protrudes from said bushing, as shown. The outer wall of the bushing is tapered or cone-shaped to seat in the flaring inner end 44 of the axial bore 45 of the detachable welding tip H. 46 is an annular tapered cup seat integral with the bushing G and in which the butt edge of the tip H is forced. The outer diameter of the butt of the tip H is greater than that of the shank of the tip, forming a circumferential shoulder 47.

I is a clamp nut having an enlarged and threaded inner bore 48 to engage the exterior threads of the annular flange 34. The bore of the nut I is recessed to accommodate the bushing G and to bear against the shoulder 47 on the tip H, as shown in Fig. 1. It is evident that by screwing up of the nut I on the flange 34, the butt of the tip H is forced into snugly wedged contact with the bushing G, forming a joint which may always be kept gas tight. When worn out a new bushing may be substituted at trifling cost. The removal of the clamp nut I permits a quick and easy change of tips.

The torch in Fig. 1 is shown adapted for welding and the tip H is shown provided with a single axial discharge bore, but it will be understood that rosette tips or those having more than one discharge bore or passage may be substituted as the needs of the particular work dictate. When the torch is being used for welding, the needle valve 31 is kept entirely closed, thus cutting off the oxygen gas from the tube E which is thus out of service. The oxygen gas passes through the tube C, passage 39 and bore 38 into the flared portion 44, of the tip bore where it meets and mingles with the acetylene gas passing from the tube D and passage 40 into the annular chamber 37, whence it escapes between the bushing G and the nozzle 36 into the flaring bore 44 of the tip H.

The fact that the bore 38 of the nozzle is of less diameter than its connecting tube 39 tends to increase the velocity of the discharge through said nozzle. Also the annular escape port of the chamber 37 is choked so that a whirling or rotary movement is imparted to the gas entering the chamber, which whirling motion characterizes the acetylene gas as it enters the flaring bore 44. It is evident that the acetylene gas strikes against and intersects the column of oxygen from all sides of the chamber bore 44 in advance of the nozzle 36, so that a perfect mixture of the two gases is effected before the mixed fluid is discharged from the tip against the work.

The proportions of the gases may be regulated by means of the slide 23, operating rod 19, walking beam 18 and valves 15 and 16. It is evident that owing to the fact that the acetylene needle valve 16 is shorter than the oxygen needle valve 15, the combustible gas is never entirely shut off from the head while the main valve 6 is open, while the oxygen may be shut off entirely by its needle valve. Thus combustion is always maintained while the torch is being used and the character of the flame may be regulated by cutting off the oxygen entirely or adjusting the proportions of the two gases.

A gas tight joint is easily maintained between the butt of the tip H and the bushing G, and in case of wear, said bushing may be inexpensively replaced. The tips are of simple, unthreaded, and therefore inexpensive construction, so that at slight cost a plurality of the same to meet different welding and brazing requirements may be kept at hand.

The form of the clamping nut I and the adjacent coacting parts is such that the heat is effectively radiated, thus maintaining a relatively low temperature in the head and handle of the torch.

When the torch is to be used for cutting, a different tip H' is substituted. In such case a coupler J is interposed between the head and the tip. The butt of said coupler is similar to the butt of the tip H in Fig. 1, its inner end being wedged over the bushing G and in the seat 46. The clamp nut I is screwed up, as before, on the external threads of the annular flange 34 of the head, bearing against the circumferential shoulder 49 of the coupler, and forcing the latter snugly into its seat on the bushing G, forming a gas tight joint. The cutting tip H' is provided with a central oxygen bore $a$, whose inner end is flared to be forced over the end of nozzle 36, so that the bore of said nozzle is connected by a gas-tight joint with the central bore $a$ of said tip. Said tip is also provided with one or more additional bores $b$ for the discharge of a preheating flame against the work. These bores $b$ are off-center in the tip, and where a plurality of such bores are provided, as shown in Figs. 9 and 10, they are preferably spaced in an annular series concentric with the central bore $a$, as shown.

In Fig. 11, the cutting tip $H^2$ is shown having the axial oxygen cutting bore $a$ while the bores $b$ of the preheating gases converge toward the outer or discharge end of the tip whereby the preheating flame is concentrated in the path of the cutting flame, thereby greatly increasing the cutting power of the oxygen flame.

Adjacent to its butt the tip H' is provided with an annular rib 50, of rectangular cross-section which enters the enlarged lower bore of the coupler J. An annular packing or gasket 51 is slipped up the tip H' against its rib 50.

K is a nut having a lower reduced bore fitting snugly on the tip H' and an enlarged internally threaded upper bore which screws onto the threaded outer end of the coupler J.

52 is an internal annular lip on the nut K which bears against and compresses the gasket 51 to form a gas-tight joint between the tip and the coupler.

It is evident that by tightening the nut I and the nut K, the tip is forced into gas-tight rigid connection with the nozzle 36 of the head F.

When the torch is used for cutting, the cutting flame at the outer end of the axial tip bore $a$ is fed from the oxygen tube C through the passage 39 and the nozzle bore 38 while the preheating flame at the mouth of the bore or bores $b$ is fed from the tubes D and E, the combustible gas and oxygen from said respective tubes mingling in the annular chamber 37 and in the upper bore of the coupler J from which the bores $b$ of the tip H' lead. The result is a perfectly mixed combustible preheating fluid. When the torch is used as for cutting, the walking beam 18 is thrown to close the needle valve 15 of the oxygen tube C and to open the needle valve 16 of the acetylene tube D. The needle valve 31 of the oxygen tube E is then opened to the proper degree to give the proper gas mixture in the annular chamber 37. Thus the preheating of the work is accomplished. When the cutting is to begin, the walking beam 18 is moved to open the valve 15 to admit oxygen to the tube C. This however does not close the needle valve 16 so that the preheating flame is not interfered with.

The advantages attending my improved torch are manifold. Among them may be mentioned the following: When the welding tip is in place, the combustible gas is mixed with the oxygen by causing the former to intersect the latter from all sides toward the axis with a whirling or revolving motion, thus insuring an intimate and perfect mixture. The removable bushing with the cup seat and the clamping nut enables a gas-tight joint and rigid connection to be made between the tip and head without expensive machinery and grinding of parts, and avoids the necessity of providing the individual tips with attaching threads. When a bushing becomes worn by long continued use, a new one may be substituted at slight cost. The expansion of the parts, caused by the heat, binds the same more tightly together, while the contour and arrangement of parts causes the heat to be efficiently radiated instead of causing the head and the remainder of the torch to become overheated. The control of the admission of the gases to the supply tubes C, D and E is such that the quantities and proportions may be nicely regulated to give the maximum efficiency. The torch may be successfully worked at either high or low or fluctuating pressure without danger of back-firing or blowing out, inasmuch as the gases are thoroughly mixed at any pressure, so that perfect combustion is always maintained.

Although for the sake of clearness I have minutely described the embodiment of my invention shown in the drawings, I do not wish to limit myself thereby but claim broadly:—

1. In a torch of the character described, a head provided with a tapered nozzle, having an axial oxygen bore, and an annular threaded flange concentric with and spaced from said nozzle, forming an annular gas chamber therewith, said head being provided with a combustible gas passage connecting with said chamber, a tapered bushing screwed into said flange and surrounding said nozzle, a tip having its inner bore flared to receive said bushing, and a clamping nut engaging said tip and screwed onto the exterior of said flange, whereby said tip is held in gas-tight union with said head.

2. In a torch of the character described, a head provided with a tapered nozzle, having an axial oxygen bore, and an annular threaded flange concentric with and spaced from said nozzle forming an annular gas chamber therewith, said head being provided with a combustible gas passage connecting with said chamber, a tapered bushing screwed into said flange and surrounding said nozzle and provided with an annular seat surrounding its base, a tip having its inner bore flared to receive said bushing and having its butt end engaging said seat, and a clamping nut engaging said tip and screwed onto the exterior of said flange, whereby said tip is held in gas-tight union with said head.

3. In a torch of the character described, a head provided with gas passages, an annular projection carried by said head and exteriorly provided with a frusto-cone shape bearing surface and an annular seat of cup shape cross section concentrically surrounding said bearing surface, a tip into which said gas passages discharge having its inner end flared to engage said bearing surface and having an annular butt edge engaging said seat, and clamping means engaging said tip and screwed onto said head whereby the butt of said tip is wedged into a gas-tight union with the walls of said seat.

4. In a torch of the character described, a head provided with an annular converging chamber into which a combustible gas is admitted, a nozzle carried by said head and extending axially through said annular chamber and beyond the same, said nozzle being provided with an axial bore into which oxygen gas is admitted, and a tip provided with an axial bore whose major and outer portion is of constant diameter and whose inner portion is flared to form a frusto-cone shape mixing chamber into which said annular chamber discharges and into which said nozzle projects to a point adjacent to the outer contracted end of said mixing chamber, whereby the combustible gas is fed into the inner end of said mixing chamber in the form of a converging annular sheet and is mixed with the oxygen at the contracted outer end of said mixing chamber and then siphoned out through the outer bore of the tip by the pressure of the oxygen, substantially as and for the purpose set forth.

Signed at Pittsburgh, Penna., this 23rd day of October, 1915.

JAMES B. ANDERSON.